INVENTORS
KOREICHI KAWAMURA
YOSHIKO KAWAMURA
KOICHI KAWAMURA

BY McGlew and Toren
ATTORNEYS

United States Patent Office 3,461,457
Patented Aug. 12, 1969

3,461,457
DEVICE FOR RECORDING SIGNALS FOR
CONTROLLING WATER FOUNTAINS
Koreichi Kawamura, Yoshiko Kawamura, and Koichi
Kawamura, all of 66 Jyomyoji, Kamakura, Japan
Filed Oct. 11, 1965, Ser. No. 494,420
Claims priority, application Japan, Nov. 20, 1964,
39/65,197
Int. Cl. G11b 5/00; H03k 13/00; H04l 3/00
U.S. Cl. 179—100.2                  5 Claims

ABSTRACT OF THE DISCLOSURE

A device for recording, modifying and reproducing electrical signals for controlling water fountains includes means for simultaneously sampling a large number of control signals for controlling elements of the water fountain, such as nozzles and illuminating devices, so as to produce simultaneous signals. The simultaneous signals are converted into sequential signals by a shift register and recorded in the form of sequential signals. Upon reproduction, the sequential signals are reconverted into simultaneous signals by the shift register, for controlling the water fountains. The simultaneous signals thus reconverted from the reproduced signals can be selectively modified by newly sampled simultaneous signals.

---

This invention relates to a device for recording electric signals for controlling water fountains, more particularly a device for recording, modifying and reproducing electrical signals for controlling water fountains. The device comprises a means to sample said electrical signals for controlling water fountains as a number of simultaneous control signal pulses at certain predetermined time intervals. A shift register converts said simultaneous control signal pulses sampled at a certain moment into a series of consecutive sequential control signal pulses based on a time division system and vice versa, by storing at least said number of simultaneous control signal pulses sampled at one time in the form of said number of digits and shifting the thus stored control signal pulses digit by digit. The device includes means to produce a series of synchronizing pulses to control timing of said sampling and said shifting, and a suitable means for recording, reproducing and erasing at least said consecutive sequential control and synchronizing pulses.

Most water fountains have been used merely to appreciate water streams projected continuously from nozzles thereof together with their background sceneries. However, the impression of water fountains to spectators will be greatly increased if a number of water streams projected from a plurality of nozzles of a large composite water fountain are controlled individually and precisely in harmony with a background music.

In order to achieve such control of water fountains, manual operation of electrical switches connected to power source circuits for solenoid valves and illuminating means thereof has been utilized as a conventional method of controlling large composite water fountains consisting of a number of nozzles and a plurality of illuminating means.

Constructions of devices for such manual operation of composite water fountains and for automatic operation thereof based on matrix circuits were disclosed in detail in copending U.S. patent applications No. 411,858 and No. 411,857 respectively, now U.S. Patents Nos. 3,292,861 and 3,294,322 respectively, which were filed on Nov. 17, 1964 by the present inventors. The invention is related to an improvement of the above devices for controlling operation of composite water fountains as will be described hereinafter, and for the sake of simplicity, the description will be made hereinafter only on the overall control means of such composite water fountains which suit harmonized operation of individual elements thereof disclosed in the above mentioned copending U.S. patent applications No. 411,858 and No. 411,857.

As an automatic means to carry out said control of water fountains by storing electrical signals for controlling such switching operations, a rotary mechanical memory drum, which is provided with a number of projections so positioned on its outer peripheral surface as to coincide with a desired mode of operation, has been used to actuate opening and closing operations of each switch connecting a power source to various regulating devices of composite water fountains, such as solenoid valves and illuminating bulbs, in response to rotation of said drum. However, such means using a drum had disadvantages in that its capacity to store control signals is limited, that modification of control signals is difficult once they are stored, that limited storage capacity of the drum makes it difficult to control large composite water fountains for a long period of time at a high speed, that mechanical control of composite water fountains can be hardly synchronized with a background music, etc.

The principal object of the invention is to provide a device for recording and reproducing electrical control signals to carry out said control of water fountains by means of a tape recorder having a number of magnetic heads, thereby facilitating automatic control of large composite water fountains in harmony with background music by actuating such regulating means of water fountains as electromagnetic valves and illuminating bulbs as well as reproduction of such control of the water fountains at any desired moment.

Another object of the invention is to provide a novel device for recording said electrical control signals in a series of sequential binary control pulses based on a time division system by using a sampling means and a shift register.

Another object of the invention is to provide a device to reproduce thus recorded sequential binary control signals into a number of regular control signals to be effective for controlling such regulating means of the water fountains as electromagnetic valves and illuminating bulbs. Still a further object of the invention is to provide a device which is capable of modifying thus recorded control signals with ease.

With the device of the invention, the number of kinds of control signals to be stored and accordingly the number of channels necessary for storing them are considerably reduced, which brings about a great advantage of simplification of storing and transferring processes of the control signals, elimination of errors in reproducing process, possibility of high speed control, ease in changeover operation between storing and reproducing processes, possibility of simultaneously conducting recording and reproducing operations, etc. Thereby high speed control of composite water fountains is made possible for a long period of time. The device of the invention has additional advantages in that the contents of memory devices can be modified repeatedly with ease, that superposition of a plurality of control signals onto contents of the memory device is made possible to produce a series of new control signals to carry out a highly complicated operation of the composite water fountains, etc. Thereby the control of water fountains in harmony with a background music is now made possible by means of storing such background music and control signals simultaneously.

For a better understanding of the invention, reference is taken to the accompanying drawings, in which, FIG. 1 is a simplified circuit diagram illustrating operative principles of a shift register to be used for mutual exchange between the simultaneous signals and the time divisional sequential signals in a memory device of the invention;

Figure 1:
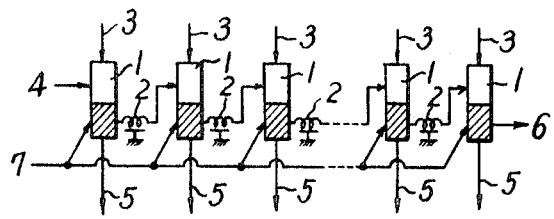
Figure 2:
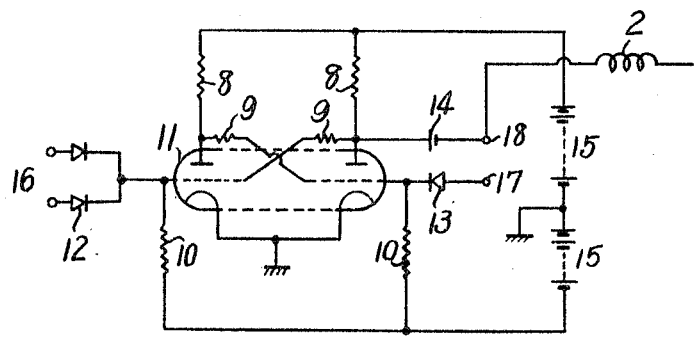
FIG. 2 is a circuit diagram showing an embodiment of bistable units to be utilized in the shift register.

Referring to FIG. 1 showing the construction of the shift register for conversion of simultaneous control signals for controlling water fountains to sequential signals based on a time division system and vice versa, reference numeral 1 designates so-called bistable flip-flop elements, of which the detailed circuit is shown as for instance in FIG. 2, 2, time delay lines; 3, simultaneous binary input signals from a control device; 4, an input terminal to receive reproduced binary sequential signals; 5, simultaneous binary output signals representing electrical signals stored in the shift register; 6, an output terminal to send out binary sequential signals; and 7, a series of shift pulses. In FIG. 2, 8 designates anode load resistors, 9, feedback resistors; 10, resistors to hold grid voltages, and 11 a duplex triode. 12 and 13 are diodes for triggering; 14, a storage battery for adjusting a D.C. output voltage; and 15, a D.C. power source. 16 and 17 are input terminals for trigger signals, and 18, an output terminal. A bistable unit is to store a binary information by means of its alternative stable condition, for instance, in a bistable unit shown in FIG. 2, either triode of the duplex triode 11 must be in conductive condition at any moment, say the left hand side one at a certain instant, while the other triode of the duplex triode, say the right hand side one thereof, should be maintained in non-conductive condition as long as said first triode, say the left hand side one, is conductive. Said condition of the duplex triode, say the left hand side triode being conductive while the right hand side is the one non-conductive, is easily reversed into an opposite condition, say the left hand side triode being non-conductive while the right hand side is the one conductive, by means of trigger signals from terminals 16 and 17 activated from outside circuits, and accordingly an opposite output signal is produced at the output terminal 18. In the present case, the trigger signal from the terminal 17 is used as an input shift pulse to produce a condition identical to that of a preselected adjacent unit. The shift register of FIG. 1 is constructed by combining such bistable units successively in a row by connecting adjacent units with pulse delay lines 2.

The operative principles of the shift register of FIG. 1 will now be explained in detail. If a set of simultaneous binary input signals 3, which will be described in detail hereinafter, are applied to the shift register so as to apply one input signal 3 to each and every one of the bistable units in the shift register simultaneously while each bistable unit is in a certain respectively preceding stable condition, then each bistable unit responds to its binary input signal so as to take that stable condition which coincides with the content of the input signal applied thereto. In other words, if the content of a binary input signal 3 applied to a certain bistable unit is the same as that represented by a stable condition taken by said bistable unit prior to application of said binary input signal thereto, then said bistable unit is to make no change at all prior and posterior to said application of said binary input signal thereto. On the other hand, if the content of another binary input signal 3 applied to another bistable unit is contrary to that represented by a stable condition taken by said other bistable unit prior to application of said other binary input signal 3 thereto, then said other bistable unit is changed over to its opposite stable condition after application of said other binary input signal thereto so that said other bistable unit may take that stable condition which coincides with the content of said other binary input signal 3. Thereby, the information contained in said set of simultaneous binary input signals is stored in the shift register in one operation.

The information thus stored in the shift register can be readily reproduced by detecting the contents or conductive conditions of each bistable unit in the shift register through their output terminals 18 as shown in FIG. 2.

The information stored in each bistable unit of the shift register at a certain instant can be shifted, for instance to its right hand side adjacent bistable unit, through the pulse delay line 2, provided that a shift pulse 7 is applied to the shift register, by holding the input signal 3 momentarily. Therefore, if the output terminal 6 of the shift register is assumed to give the original information stored in the extreme right end bistable unit of the shift register prior to application of any shift pulse 7, then the same output terminal 6 will give the original information stored in the second bistable unit from the extreme right end after the first application of the shift pulse 7. Similarly, as the shift pulse 7 is applied to the shift register at certain intervals, the output terminal 6 of the shift register will send out information contained in each bistable unit one by one, starting from the extreme right end thereof, in turn in response to each application of the shift pulse 7.

When the number of repeated applications of the shift pulse 7 is equal to the number of the bistable units, the entire information stored in the shift register will be given out through the output terminal 6 thereof. Then the shift register is ready to receive a new set of simultaneous binary input signals 3, and thereafter storing, shifting and sending out of such simultaneous binary signals will be repeated through the same procedure as described in the foregoing.

With such a shift register, a number of sets of simultaneous binary signals can be converted into a single series of sequential binary signals, consisting of a number of binary pulses, based on a time division system. Accordingly, construction of the memory device for storing such simultaneous binary signals can be greatly simplified.

In order to reproduce a set of simultaneous binary signals on the shift register from thus converted series of sequential binary signals, at first each binary signal to be reproduced should be applied to the input terminal 4 of the shift register one at a time in the same sequence as defined in said simultaneous-sequential conversion process. In the meantime, said binary signal thus applied to the input terminal 4, as well as each binary signal stored in each bistable unit in the shift register, should be shifted to the next right hand side adjacent bistable unit therein successively, by means of shift pulse 7, in response to each application of a binary signal to input terminal 4. Then, those binary signals which form a desired set of simultaneous binary signals will be reproduced in the shift register after carrying out a number of shifting operations which coincides with the number of bistable units in the shift register, in a manner similar but in opposite direction, to the aforementioned procedure for sending out a set of simultaneous binary signals stored in the shift register. Thereby, the desired set of simultaneous binary signals can be reproduced in the shift register in the same fashion as they were once stored therein prior to conversion to a series of sequential binary signals.

If all the binary signals thus stored in each bistable unit of the shift register are detected and taken out at one time as shown by simultaneous signals 5 in FIG. 1, then binary signals stored sequentially in a separate recording medium can be now restored into a set of original simultaneous binary signals.

Figure 3:
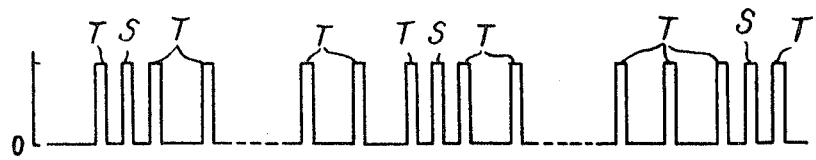
FIG. 3 is a diagram graphically illustrating the wave form of an example of synchronizing signals to control timing of the shift register and a sampler.

In order to notify the shift register that the number of times of repetition of applying the shift pulse 7 is increased to the number of bistable units therein, a separate synchronizing signal is used. Said synchronizing signal comprises shift pulses T and sampling pulses S as shown in FIG. 3, wherein each sampling pulse S appears whenever the number of consecutive repetitions of the shift pulses T is equal to the number of the bistable units in the shift register.

The sampling pulses S can be discriminated from the synchronizing signal, for instance by gating the synchronizing signal with a gating signal produced by delaying said synchronizing signal by a certain predetermined time. After discriminating and eliminating sampling pulses S out of the synchronizing signal, only shift pulses T will be left.

Figure 4:
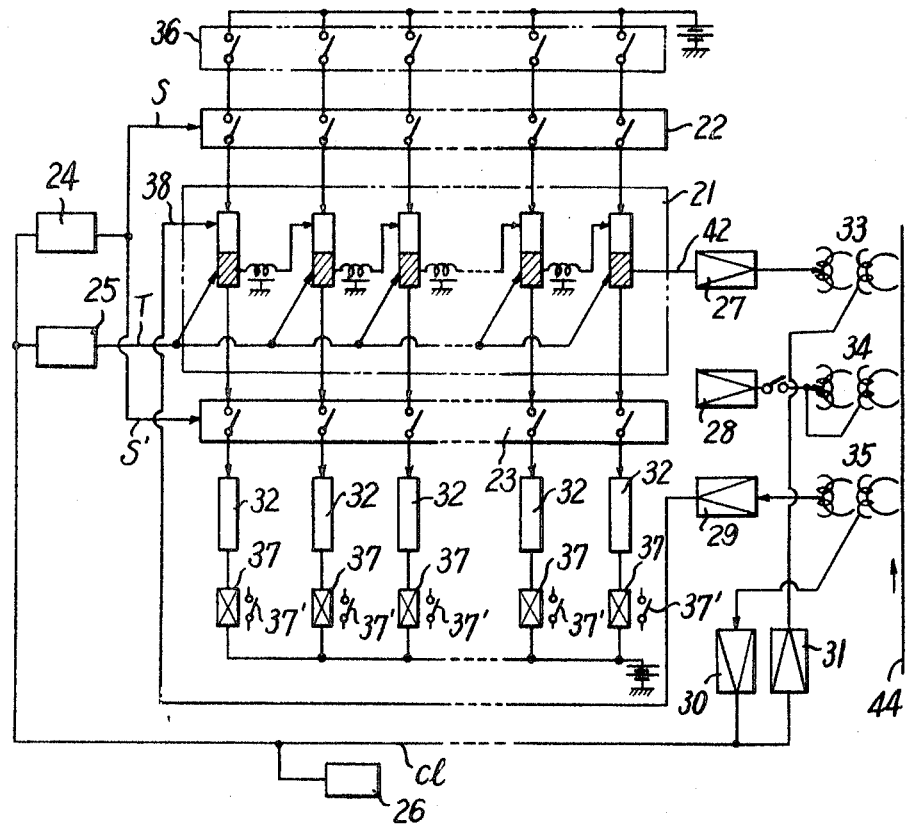
FIG. 4 is a connection diagram of a device for storing electrical signals for controlling composite water fountains on a magnetic tape according to the invention.

FIG. 4 shows the construction of a device for storing, reproducing and modifying electrical signals to control composite water fountains, consisting of a number of water fountain nozzles, by using said shift register. In the device of FIG. 4, if it is assumed that the number of control signals to be produced simultaneously at one time for controlling the composite water fountains is 100, then in order to store such control signals properly, 100 sets of said binary units are necessary as well as the same number of pulse duration modulators 32 and relays 37 connected in series thereto, while only five of such sets are shown in FIG. 4 for simplicity. An input sampler 22 samples the input control signals produced by a control signal generator 36, such as an electrical keyboard operated by an operator or a performer of the composite water fountains, at predetermined intervals, say every one fifth of a second. The input sampler 22 can be for instance a gate circuit comprising 100 gate units, each of which is connected in series with a respective key of said keyboard, on the one hand, and also with a respective bistable unit of the shift register, on the other hand, whereby said 100 gate units are, for instance, controlled by a single gating pulse S so as to be conductive for a very short limited period of time, say about a few microseconds. Thereby the operative conditions of 100 control elements of the control signal generator 36, such as 100 electrical keys on a keyboard, can be represented by 100 simultaneous on-or-off binary signals, and furthermore such binary signals can be transmitted from the control signal generator 36 to 100 bistable units of the shift register 21 respectively in every one fifth of a second through the input sampler 22 during said short period of time when said input sampler is in conductive condition.

The input control signals thus transmitted to the shift register 21 are stored in the bistable units for a certain predetermined period of time. In the meantime, the control signals are further transmitted to respective pulse duration modulators 32 through an output sampler 23 so that each control signal may be stored in a respective pulse duration modulator 32 to carry out the desired control operation of the composite water fountains through the associated relay 37, each of which is provided with at least one contact 37' connected to one or more of the control devices of the composite water fountains such as electromagnetic valves and illuminating means.

On the other hand, the information stored in the shift register 21 is sent out of its output terminal 42 responsive to a shift pulse T produced by a shift pulse generator 25 at a certain predetermined rate, say 500 pulses per second, in the manner as described in detail with regard to the operation of the shift register shown in FIGS. 1 to 3.

The control signals thus taken out can be then recorded on a control signal track of a magnetic tape 44 through a recording signal amplifier 27 and a control signal recording head of recording heads 33.

At the same time a synchronizing signal $Cl$ is amplified by a synchronizing signal amplifier 31 and then applied to a synchronizing signal recording head of recording heads 33 to record them on a synchronizing signal track of the magnetic tape 44.

Said synchronizing signal $Cl$ can be obtained by inserting a sampling pulse S of a certain repetition frequency, say 5 pulses per second, produced by dividing the repetition frequency of the shift pulses T, say 500 pulses per second, by means of a central counter located at the synchronizing signal generator 26, into said shift pulses T in a suitable fashion.

When the 100th pulse of a set of shift pulses between adjacent sampling pulses S is applied to the shift register 21 one fifth of a second after the first shift pulse thereof being applied thereto, the entire information stored in the shift register 21 is sent out through the output terminal and now the register is ready to take new set of simultaneous information from the control pulse generator 36, and thereafter the aforementioned process will be repeated again cyclically.

In order to reproduce desired simultaneous control signals from signals recorded on the magnetic tape 44, the sequential control signals stored in the tape 44 are at first reproduced successively by a control signal reproducing head of reproduction heads 35 and then amplified by a reproduced control signal amplifier 29 prior to their application to the input terminal 38 of the shift register 21 as input signals thereto. Meanwhile, shift pulses T can be generated by reproducing at first the synchronizing signals $Cl$ recorded on the magnetic tape 44 by a synchronizing signal reproducing head of reproduction head 35 and then by amplifying thus reproduced synchronizing signals $Cl$ by a reproduced synchronizing signal amplifier 30 and finally by discriminating those pulses having a repetition frequency of 500 pulses a second out of thus amplified synchronizing signal $Cl$ by means of a suitable conventional discriminator. Said sequential control signals applied to the input terminal of the shift register 21 can now be stored in bistable units of the shift register as a desired set of simultaneous control signals by applying the thus obtained shift pulses T to the shift register in conjunction with said sequential control signals.

The simultaneous control signals thus stored in the shift register 21 can be then read out by applying a sampling pulse S' to the output sampler 23, said sampling pulse S' being generated by discriminating it from said reproduced synchronizing signals $Cl$ at each end of a group of 100 pulses of said shift pulses T by means of a suitable conventional discriminator.

The simultaneous control signals thus reproduced, which are identical in nature to the one obtained from the control signal generator 36 for recording purposes, are then stored in the pulse duration modulator 32 for the time being, say during the following one fifth of a second, until the next following set of control signals is sampled. Thereby control of the composite water fountains can be carried out with thus reproduced control signals, which are now stored in the pulse duration modulators 32 for actuating proper relays 37. In order to prevent false recording of thus reproduced control signals once again, which appear at the output terminal 42 of the shift register one fifth of a second after being applied to the input terminal 38 thereof, the control signal recording amplifier 27 and the synchronizing signal recording amplifier 31 are de-energized during reproduction operation of the device of the invention.

As shown in the foregoing, it is not necessary to change over the circuitry of the control signals in selecting recording or reproducing operations of the control signal. Accordingly, control of large composite water fountains using a large number of control signals is considerably simplified. Such elimination of the changeover operation also enables very simple modifying and addition of control signals recorded on a magnetic tape by means of simultaneous recording and reproduction.

In order to carry out modification and addition on the recorded control signals, both the control signal recording amplifier 27 and the reproduced control signal amplifier 29 are energized simultaneously thereby control signals read out of the magnetic tape 44 are at first amplified by the reproduced control signal amplifier 29 and then passed through the shift register 21 to be applied to the control signal recording head via said amplifier 27, and thus said control signals are recorded since once again on the same magnetic tape 44. If a new set of control signals are applied to the shift register 21 from the control signal generator 36 while said reproduced control signals are still stored in the bistable units therein by actuating the input sampler 22 in synchronism with the energization of the output sampler 23 upon arrival of the sampling pulse S' located at the end of said reproduced control signals, then said new signals from the control signal generator 36 will be superposed on the reproduced control signals while being stored at the shift register 21, to carry out modification and addition on the latter control signals. The control signals thus modified and added at the shift register 21 by said newly produced control signals are now given to the output side pulse duration modulators 32 in order to carry out thus modified control instructions through relays 37.

In said modifying and adding process, the old signals left on the magnetic tape 44 are erased by a control signal erasing head of erasing heads 34, which are driven by an erasing heads driving device 28, within one fifth of a second before the modified control signals complete their travel through the shift register 21 and arrive at the control signal recording head.

Figure 5:
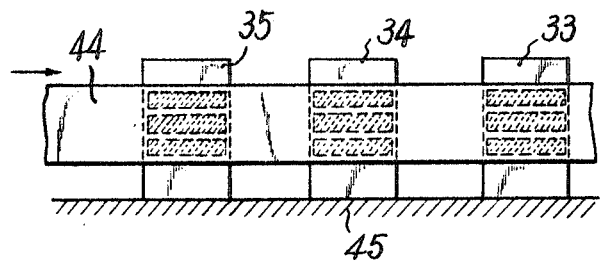
FIG. 5 is a diagram illustrating the layout of magnetic heads of a tape recorder to be used in the above memory device.

FIG. 5 shows a layout of magnetic recording heads 33, reproducing heads 35 and erasing heads 34 according to the method of the invention, wherein each magnetic head is rigidly supported on a supporter 45 in a sequence as shown in FIG. 5 provided that the direction of the magnetic tape movement is as shown by the arrow therein. Each group of reproducing heads 35, erasing heads 34 and recording heads 33 comprises three elementary heads for control signals, synchronizing signals and sound signals respectively, and said elementary heads are aligned perpendicular to the direction of the tape travel. As described in the foregoing, the embodiment of the invention shown in FIGS. 4 and 5 utilizes separate magnetic heads for recording, reproducing and erasing synchronizing signals as well as a separate track on the magnetic tape for recording synchronizing signals. However, if synchronizing signals are somehow incorporated within the control signals, then the separate heads for recording, reproducing and erasing synchronizing signals and the separate synchronizing signal track on the magnetic tape are no longer necessary. The distance between the reproducing heads 35 and the recording heads 33 is selected to be substantially equal to the distance to be travelled by the magnetic tape 44 within the period of time taken by the travelling of the control signal from the input terminal 38 to the output terminal 42 of the shift register 21, say one fifth of a second in the case of the above embodiment of the invention.

With said arrangement, it is possible to modify the contents of the control signals while causing no change at all in the time correlations between the control signals on a track of the magnetic tape 44 and synchronizing and sound signals recorded on different tracks of the same magnetic tape 55. Thereby highly complicated modes of operation of the composite water fountains can be successfully controlled with comparative ease, and control signals for such an operation can be recorded for later reproduction thereof.

In controlling operation of composite water fountains, if any manual control system is utilized based on manipulation of hand-operated switches, then there will be a considerable time delay due to such hand operation and accordingly the mode of performance of the composite water fountains will be forced to be monotonous, whereas if the control system of the invention, as described in the foregoing, is utilized, the operative mode of any water fountains can be modified readily, while seeing said water fountain performance, by means of modifying the control signals of the water fountain operation in said overlapping manner. The mode of operation of water fountains obtained by the control system of the invention can be made far more delicate and complicated than that produced by any conventional control device therefor.

Figure 6:
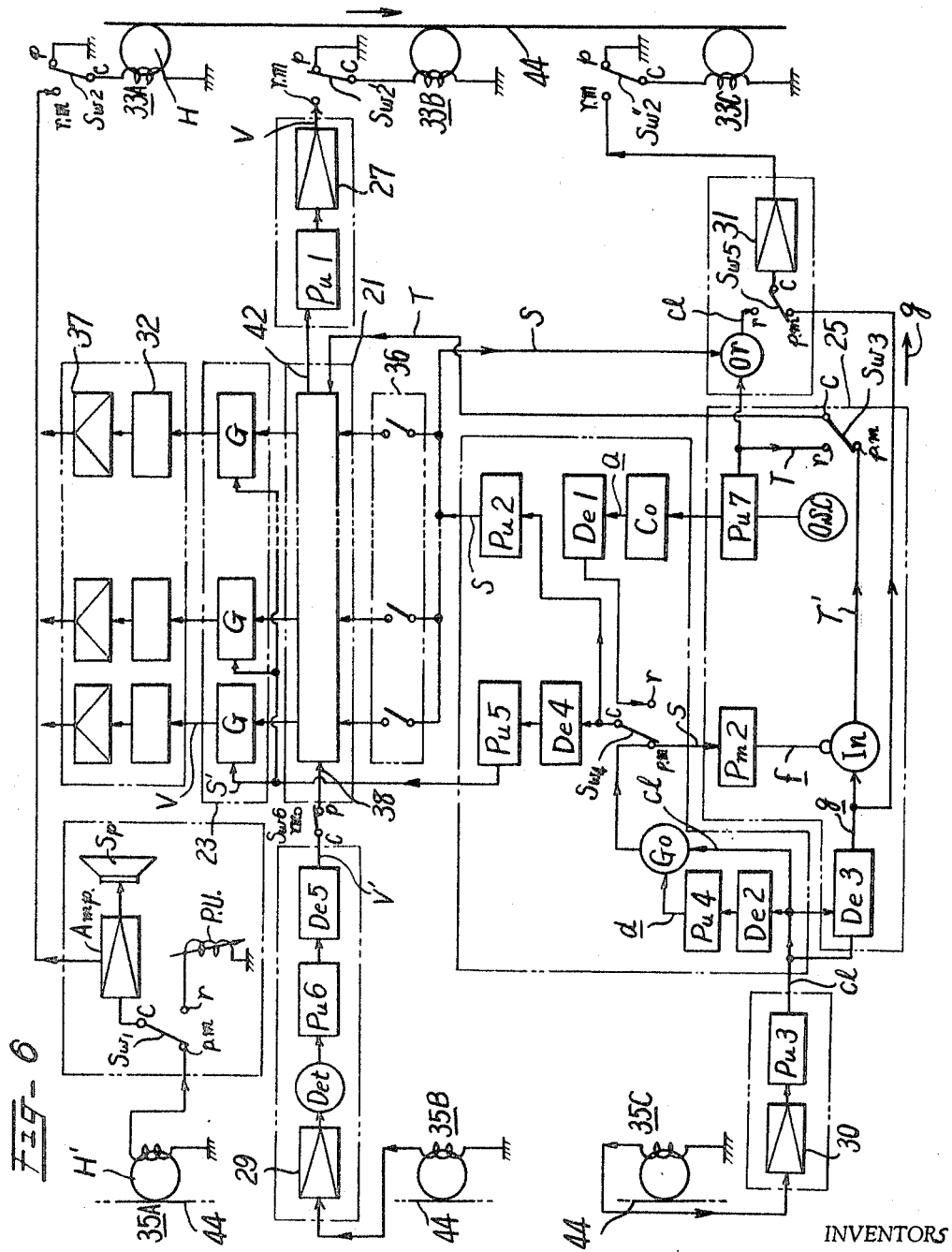
FIG. 6 is an overall block diagram illustrating the construction and arrangement of the recording device of the invention.

FIG. 6 illustrates another embodiment of the invention which includes effects of background music, while the preceding embodiment controls only the mechanical performance of the water fountains. In FIG. 6, all switches are shown at their positions taken during reproducing or playing conditions. According to the embodiment of FIG. 6, the magnetic recording tape 44 records sound signals in addition to the aforementioned synchronizing and sequential control signals. Thereby the dynamic performance of the water fountains can be controlled effectively in synchronism with the musical performance of recorded sound signals, say a symphony.

In the embodiment of FIG. 6, there are three tracks provided in the magnetic tape 44, namely track A for recording sound signals, track B for control signals of mechanical performance of the water fountains, and track C for synchronizing signals. Accordingly, each group of recording and reproducing heads is provided with separate elements for each signal, i.e. sound signal recording head 33A, sound signal reproducing head 35A, control signal recording head 33B, control signal reproducing head 35B, synchronizing signal recording head 33C, and synchronizing signal reproducing head 35C. Here, the synchronizing signal comprises a series of pulses based on a time division system for providing proper timing to control signal recording and reproducing operations.

The sound system comprises a pickup PU, a loudspeaker Sp connected to an amplifier Amp, a recording head 33A, double throw switches Sw1 and Sw2, and a reproducing head 35A, as in the case when a conventional tape recorder is used.

Said double throw switches Sw1 and Sw2 are switched over by a gang-operating means in order to select between recording, reproducing and modifying operations of the device of the invention. Each double throw switch has a common stationary contact c and three contacts to be selected for different operations, namely a contact p for reproducing operation, a contact r for recording operation, and a contact m for modifying operation. During reproducing operation of the device of FIG. 6, a closed sound signal circuit is formed from ground through the sound signal reproducing head 35A, terminals p, m and c of the switch Sw1, and the amplifier Amp and back to ground. Thereby the loudspeaker Sp is energized by sound signals reproduced by the sound signal reproducing head 35A. It is apparent from FIG. 6 that recording operation of the sound signal can be carried out with the pickup PU by establishing suitable circuits by gang-operating double throw switches Sw1 and Sw2, that is to say, the recording circuit traces from ground through the pickup PU, terminals r and c of the double throw switch Sw1, the amplifier Amp, terminals r, m and c of the double throw switch Sw2 and the recording head 33A and back to the earth.

Referring to FIG. 6, wherein the same symbols used in FIG. 4 designate the same devices therein, control signals from the control signal generator 36, such as a keyboard, are applied to the shift register 21 as input signals thereto, in a manner to be described hereinafter, and stored as a series of binary digits in the bistable units therein. At the same time, the control signals thus stored in the shift register 21 are transferred to relays 37 for controlling the water fountains through the output sampling device 23 consisting of gate circuits G and pulse duration modifiers 32. In the meantime, the control signals stored in the shift register 21 are shifted toward the output terminal 42 digit by digit by means of shift pulses T ( wave form thereof is shown as the curve T in FIG. 7) produced by the shift pulse generator 25. Thereafter such control signals are sent out of the shift register 21 and recorded on the magnetic tape 44 with the recording head 33B after being shaped into such a wave form as shown by the curve T in FIG. 7 through a pulse shaping circuit $Pu1$ and an amplifier 27. The shift pulse T is at first generated by a tuning fork controlled oscillator OSC and then shaped by a pulse shaping circuit $Pu7$, and then applied to the shift register by way of terminals r and c of a double throw switch $Sw3$ in the pulse generator 25.

Meanwhile, the sampling pulse portion of the synchronizing signal $Cl$ is formed by modifying the output signal from the pulse shaping circuit $Pu7$ while passing said output signal through a central counter $Co$ to detect each 100th pulse of a series of shift pulses T, a time delay network $De1$, contacts r and c of a double throw switch $Sw4$ and a pulse shaping circuit $Pu2$. Thereafter the thus shaped sampling pulses S are applied to an adder $Or$ in order to add the thus produced sampling pulses S to shift pulses from the pulse shaping circuit $Pu7$ and generate the desired synchronizing signals as shown by the curve $Cl$ of FIG. 7. The synchronizing signal from the adder $Or$ is recorded on the magnetic tape 44 via contacts r and c of a double throw switch $Sw5$, an amplifier 31 and a synchronizing signal recording head 33C.

Figure 7:
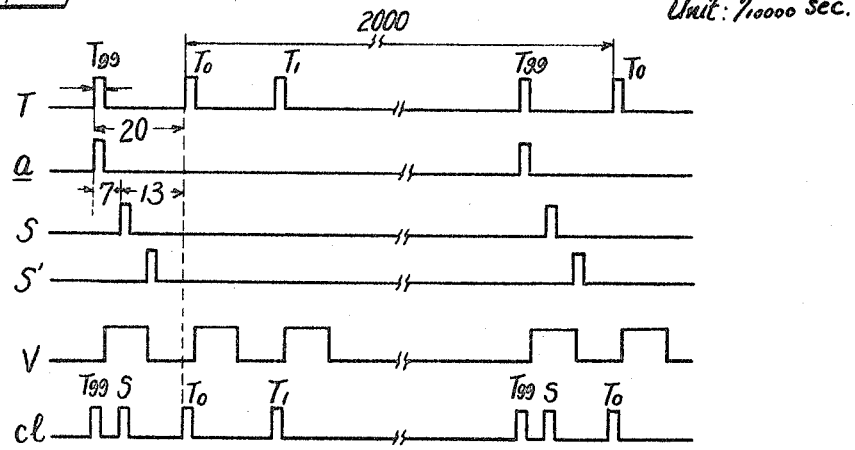
FIGS. 7 and 8 are diagrams graphically illustrating the wave forms of signals at major points of the device of FIG. 6 during recording and reproducing or retouching processes respectively.

Referring to FIG. 7, wherein the curve T shows a series of shift pulses, $a$ output signals from the central counter $Co$, S sampling pulses S for input control signals, S′ sampling pulses for the output sampler 23, V control signal pulses, and $Cl$ a series of synchronizing signal pulses, the abscissa represents time expressed in multiples of a period of time determined by the system of control, e.g. 100 $\mu$s. (microseconds) in the case of the embodiment shown in FIGS. 4 and 6, and the suffix numeral of individual shift pulses T designates the sequential number of each shift pulse in each group of shift pulses between adjacent sampling pulses. S in the series of synchronizing signal pulses $Cl$ also designates a sampling pulse.

With the control system shown in FIG. 6, it is possible to control the performance of the composite water fountains, consisting of a number of elementary individual fountains in harmony with a background music, such as a symphony, by means of actuating the control signal generator 36, for instance a keyboard, and accordingly relays 37 for actuating control means of the water fountains in harmony with said music given through the loudspeaker $Sp$. In the meantime, such background music and control signals utilized in producing said performance of the water fountains in harmony with said background music are recorded on the tape 44 simultaneously, and said background music and the performance of water fountains can be readily reproduced in good synchronism and harmony by reprducing thus recrded musical and control signals with the device of FIG. 6.

In order to reproduce the musical and mechanical control signals from the magnetic recording tape 44, all double throw switches $Sw1$ to $Sw6$ are turned over to take positions as shown in FIG. 6. Then as the magnetic recording tape 44 moves along in the device of the invention, the synchronizing signals recorded on the track C thereof are reproduced by the synchronizing signal reproducing head 35C, and then amplified and shaped through the reproduced synchronizing signal amplifier 30 and a pulse shaping circuit $Pu3$ to produce a synchronizing signal as shown by the curve $Cl$ of FIG. 8. The synchronizing signal $Cl$ thus reproduced is applied to a gate network $Go$ in two ways, namely directly on the one hand and through a series circuits comprising a time delay circuit $De2$ to give a time delay of 700 $\mu$s. and a pulse shaping circuit $Pu4$ on the other hand. Thereby the gate network $Go$ is provided with two series of input pulses as shown by the curves $Cl$ and $d$, respectively, in FIG. 8. The gate circuit $Go$ produces the sampling pulses S as shown by the curve S of FIG. 8 by taking advantage of overlapping portions of said two series of pulses $Cl$ and $d$. The sampling pulses S thus produced is applied to the control signal generator such as a keyboard through said pulse shaping circuit $Pu2$ on the one hand, and the sampling pulses S are also transferred to an inhibition gate $In$ through a pulse duration modulator $Pm2$, which modifies the wave form of the sampling pulses from the curve S to the curve $f$ in FIG. 8 on the other hand. The reproduced synchronizing signal $Cl$ is also applied to said inhibition gate $In$ through a time delay circuit $De3$, which delays the synchronizing signal $Cl$ by 100 $\mu$s. to produce pulses $g$ as shown by the curve $g$ in FIG. 8. Thereby, the inhibition gate $In$ produces the shift pulses T′ by taking advantage of the overlapping of said two series of pulses $f$ and $g$. The shift pulses T′ have a wave form identical, except for a minor time delay, with said shift pulses T produced by the tuning fork controlled oscillator OSC and the pulse shaping circuit $Pu7$. The shift pulses T′ thus produced are of course applied to the shift register 21 through contacts $p$, $m$ and $c$ of the double throw switch $Sw3$.

Figure 8:
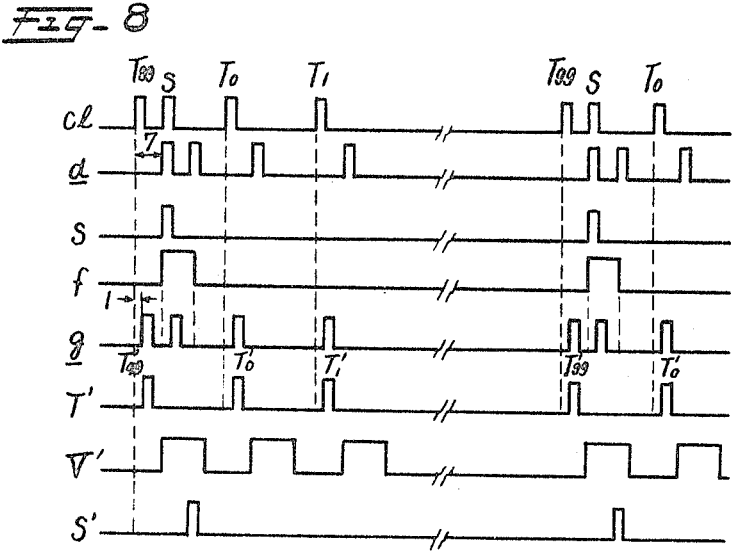

The sampling pulses S from the gate network $Go$ are also branched and modified by a time delay circuit $De4$ giving a time delay of 300 $\mu$s. and a pulse shaping circuit $Pu5$ to produce output sampling pulses S′ as shown by the curve S′ in FIG. 8, which are of course directly applied to each gating element G of the output sampler 23 in order to carry out control of the water fountains by gating and forwarding the control signals stored in the shift register to the relays 37.

The reproduced synchronizing signals are also branched off and applied to the synchronizing signal recording amplifier 31 through contacts $p$, $m$ and $c$ of the double throw switch $Sw5$ in order to re-record the synchronizing signal on the magnetic recording tape 44 with the recording head 33C.

The control signals V recorded on the track B of the magnetic recording tape 44 are reproduced by means of the reproducing head 35B and modified through an amplifier 29, a detector $Det$, a pulse shaping circuit $Pu6$ and a time delay circuit $De5$ into signals having a wave form as shown by the curve V′ of FIG. 8.

In order to to apply modification and addition on the control signals V in the course of said reproduction thereof, said double throw switches $Sw1$ to $Sw6$ should be turned to their $m$ positions at first and then the control pulse generator 36 be actuated, for instance by operating a keyboard. Thereby modification or addition to the recorded control signals can be effected in the same manner as described with regard to the system of FIG. 4.

Erasing heads are not illustrated in FIG. 6. However, they can be readily added to the system of FIG. 6 in the same way as described with respect to the system of FIG. 4.

As clearly shown in the preceding descriptions, according to the invention, a novel and excellent shift register is introduced to convert simultaneous control signals into sequential control signals and vice versa for recording purposees. Thereby recording, reproducing and transmitting of control signals to control composite water fountains of large scale at a high speed for a long duration, which have been impossible heretofore, are now made possible. In addition, if the device of the invention is used to control the performance of the composite water fountains in harmony with a background music such as a symphony, the esthetic effects of the water fountains on the viewers will be greatly increased.

What we claim is:

1. A device for recording, modifying and reproducing electrical signals, for controlling water fountains, said device comprising, in combination, a control signal generator including a preselected number of control elements each selectively operable to produce an "on" binary signal or an "off" binary signal; sampling means connected to said generator to receive said binary signals; a shift register connected to said sampling means and including a number of binary units equal to said number of control elements; pulse generating means connected to said sampling means and said shift register and producing a series of synchronizing pulses including shift pulses and sampling pulses with each sampling pulse appearing between consecutive groups of shift pulses each including a number of shift pulses equal to said number of control elements; said sampling pulses activating said sampling means, at predetermined small intervals, to transfer all the binary signals in said sampling means simultaneously to said shift register, said shift register storing the transferred binary signals as a corresponding number of binary digits; said shift pulses activating said shift register, on a time-division system, to shift all the binary signals, stored therein during a single transfer from said sampling means, digit-by-digit to its output to provide thereat a series of consecutive sequential control signal pulses; and transducer means connected to said shift register and selectively operable to record, reproduce, or erase at least said series of consecutive sequential control signal pulses and said synchronizing pulses; said shift pulses activating said shift register to convert sequential control signal pulses, supplied to said shift register by said transducer means operating in the reproduction mode, into simultaneous control signal pulses, by storing each received sequential control signal pulse and shifting the same, while simultaneously receiving and storing the next succeeding sequential control signal pulse, responsive to each shift pulse.

2. A device for recording, modifying and reproducing electrical signals for controlling water fountains, as claimed in claim 1, including output sampling means connected to each of said binary units and to said pulse generating means; and a plurality of pulse duration modulators connected to said output sampling means and equal in number to said number of control elements; sampling pulses activating said output sampling means, at predetermined small intervals, to transfer all of the binary signals stored in said shift register simultaneously to the respective pulse duration modulators.

3. A device for recording, modifying and reproducing electrical signals for controlling water fountains, as claimed in claim 1, in which said sampling pulses, responsive to completion of the storage of said reproduced sequential control signal pulses in said shift register as simultaneous controlled signal pulses, activating said first-mentioned sampling means to transfer all the binary signals therein simultaneously to said shift register for storage therein and superposition on the reproduced control signal pulses; said transducer means operating in the erase and recording modes to erase the previously recorded sequential control signal pulses and to record the modified control signal pulses produced at the output of said shift register as a series of consecutive control signal pulses responsive to shifting operation of said shift register by said shift pulses.

4. A device for recording, modifying and reproducing electrical signals for controlling water fountains, as claimed in claim 3, in which sampling pulses activate said output sampling means simultaneously to transfer all the modified control signals stored in said shift register to the respective pulse duration modulators.

5. A device for recording, modifying and reproducing electrical signals for controlling water fountains, as claimed in claim 1, including a source of sound connected to said transducer means operating in the recording mode, to record sound in synchronism with the recording of said series of consecutive sequential control signal pulses.

References Cited
UNITED STATES PATENTS

| | | | |
|---|---|---|---|
| 2,580,771 | 1/1952 | Harper | 340—174 |
| 2,918,524 | 12/1959 | Hume | 179—100.2 |
| 2,953,777 | 9/1960 | Gridley | 346—34 |

BERNARD KONICK, Primary Examiner

R. S. TUPPER, Assistant Examiner

U.S. Cl. X.R.

239—16; 340—347, 174